(12) United States Patent
Meyer et al.

(10) Patent No.: US 7,593,576 B2
(45) Date of Patent: Sep. 22, 2009

(54) SYSTEMS AND METHODS OF MANAGING AUDIO AND OTHER MEDIA

(75) Inventors: Joel R. Meyer, Lake Oswego, OR (US); Geoffrey B. Rhoads, West Linn, OR (US)

(73) Assignee: Digimarc Corporation, Beaverton, OR (US)

( * ) Notice: Subject to any disclaimer, the term of this patent is extended or adjusted under 35 U.S.C. 154(b) by 917 days.

(21) Appl. No.: 11/004,711

(22) Filed: Dec. 3, 2004

(65) Prior Publication Data

US 2005/0091268 A1   Apr. 28, 2005

Related U.S. Application Data

(63) Continuation of application No. 09/769,017, filed on Jan. 24, 2001, now Pat. No. 6,829,368, and a continuation-in-part of application No. 09/563,664, filed on May 2, 2000, now Pat. No. 6,505,160.

(60) Provisional application No. 60/178,028, filed on Jan. 26, 2000.

(51) Int. Cl.
*G06K 9/00* (2006.01)
*G06K 9/36* (2006.01)
*G06K 9/46* (2006.01)
*G06K 9/54* (2006.01)
*G06K 9/60* (2006.01)

(52) U.S. Cl. .................. 382/190; 382/232; 382/306

(58) Field of Classification Search ......... 382/305–307, 382/190, 232

See application file for complete search history.

(56) References Cited

U.S. PATENT DOCUMENTS

| 3,406,344 A | 10/1968 | Hopper |
| 3,586,781 A | 6/1971 | Jones |
| 3,810,156 A | 5/1974 | Goldman |
| 3,919,479 A | 11/1975 | Moon et al. |
| 4,071,698 A | 1/1978 | Barger, Jr. et al. |

(Continued)

FOREIGN PATENT DOCUMENTS

EP   161512   11/1985

(Continued)

OTHER PUBLICATIONS

U.S. Appl. No. 60/232,618, filed Sep. 14, 2000, Cox.

(Continued)

*Primary Examiner*—Wesley Tucker

(57) ABSTRACT

The present invention relates generally to fingerprinting (e.g., deriving identifying data from audio or other media content). One claim recites a method including: obtaining identifying data derived with fingerprinting from data representing audio elements of an audio signal or derived with fingerprinting from data representing video picture elements of a video signal, the audio signal or video signal corresponding to a media signal captured by a wireless handheld device; determining a media title that corresponds to the identifying data; determining usage rights associated with at least one of the media title or a user of the wireless handheld device; identifying the user of the wireless handheld device or a library of the media titles that is associated with the user of the wireless handheld device; and adding the media title to the library of media titles that is associated with the user if so permitted by the usage rights. Of course, other claims and combinations are provided as well.

30 Claims, 3 Drawing Sheets

U.S. PATENT DOCUMENTS

| | | | |
|---|---|---|---|
| 4,230,990 A | 10/1980 | Lert, Jr. et al. | |
| 4,284,846 A | 8/1981 | Marley | |
| 4,432,096 A | 2/1984 | Bunge | |
| 4,450,531 A | 5/1984 | Kenyon et al. | |
| 4,495,526 A | 1/1985 | Baranoff-Rossine | |
| 4,499,601 A | 2/1985 | Matthews | |
| 4,511,917 A | 4/1985 | Kohler et al. | |
| 4,547,804 A | 10/1985 | Greenberg | |
| 4,677,466 A | 6/1987 | Lert, Jr. et al. | |
| 4,682,370 A | 7/1987 | Matthews | |
| 4,697,209 A | 9/1987 | Kiewit et al. | |
| 4,739,398 A | 4/1988 | Thomas | |
| 4,776,017 A | 10/1988 | Fujimoto | |
| 4,807,031 A | 2/1989 | Broughton et al. | |
| 4,843,562 A | 6/1989 | Kenyon et al. | |
| 4,858,000 A | 8/1989 | Lu | |
| 4,888,798 A | 12/1989 | Earnest | |
| 4,945,412 A | 7/1990 | Kramer | |
| 4,972,471 A | 11/1990 | Gross | |
| 5,019,899 A | 5/1991 | Boles et al. | |
| 5,023,907 A | 6/1991 | Johnson et al. | |
| 5,031,228 A | 7/1991 | Lu | |
| 5,276,629 A | 1/1994 | Reynolds | |
| 5,303,393 A | 4/1994 | Noreen et al. | |
| 5,400,261 A | 3/1995 | Reynolds | |
| 5,410,598 A | 4/1995 | Shear | |
| 5,436,653 A | 7/1995 | Ellis et al. | |
| 5,437,050 A | 7/1995 | Lamb et al. | |
| 5,481,294 A | 1/1996 | Thomas et al. | |
| 5,486,686 A | 1/1996 | Zdybel, Jr. et al. | |
| 5,504,518 A | 4/1996 | Ellis et al. | |
| 5,539,635 A | 7/1996 | Larson, Jr. | |
| 5,564,073 A | 10/1996 | Takahisa | |
| 5,572,246 A | 11/1996 | Ellis et al. | |
| 5,572,653 A | 11/1996 | DeTemple et al. | |
| 5,574,519 A | 11/1996 | Manico et al. | |
| 5,574,962 A | 11/1996 | Fardeau et al. | |
| 5,577,249 A | 11/1996 | Califano | |
| 5,577,266 A | 11/1996 | Takahisa et al. | |
| 5,579,124 A | 11/1996 | Aijala et al. | |
| 5,581,658 A | 12/1996 | O'Hagan et al. | |
| 5,581,800 A | 12/1996 | Fardeau et al. | |
| 5,584,070 A | 12/1996 | Harris et al. | |
| 5,612,729 A | 3/1997 | Ellis et al. | |
| 5,613,004 A * | 3/1997 | Cooperman et al. | 380/28 |
| 5,621,454 A | 4/1997 | Ellis et al. | |
| 5,629,980 A | 5/1997 | Stefik et al. | |
| 5,640,193 A | 6/1997 | Wellner | |
| 5,661,787 A | 8/1997 | Pocock | |
| 5,663,766 A | 9/1997 | Sizer, II | |
| 5,671,267 A | 9/1997 | August et al. | |
| 5,708,478 A | 1/1998 | Tognazzini | |
| 5,737,025 A | 4/1998 | Dougherty et al. | |
| 5,740,244 A | 4/1998 | Indeck | |
| 5,751,854 A | 5/1998 | Saitoh et al. | |
| 5,761,606 A | 6/1998 | Wolzien | |
| 5,765,152 A | 6/1998 | Erickson | |
| 5,765,176 A | 6/1998 | Bloomberg | |
| 5,774,452 A | 6/1998 | Wolosewicz | |
| 5,778,192 A | 7/1998 | Shuster et al. | |
| 5,781,914 A | 7/1998 | Stork et al. | |
| 5,832,119 A | 11/1998 | Rhoads | |
| 5,838,458 A | 11/1998 | Tsai | |
| 5,841,978 A | 11/1998 | Rhoads | |
| 5,842,162 A | 11/1998 | Fineberg | |
| 5,845,281 A | 12/1998 | Benson et al. | |
| 5,862,260 A | 1/1999 | Rhoads | |
| 5,889,868 A | 3/1999 | Moskowitz et al. | |
| 5,892,900 A | 4/1999 | Ginter et al. | |
| 5,893,095 A | 4/1999 | Jain et al. | |
| 5,901,224 A | 5/1999 | Hecht | |
| 5,902,353 A | 5/1999 | Reber et al. | |
| 5,903,892 A | 5/1999 | Hoffert et al. | |
| 5,905,248 A | 5/1999 | Russell et al. | |
| 5,905,800 A | 5/1999 | Moskowitz et al. | |
| 5,915,019 A | 6/1999 | Ginter et al. | |
| 5,915,027 A | 6/1999 | Cox et al. | |
| 5,918,223 A | 6/1999 | Blum et al. | |
| 5,930,369 A | 7/1999 | Cox et al. | |
| 5,932,863 A | 8/1999 | Rathus | |
| 5,938,727 A | 8/1999 | Ikeda | |
| 5,940,135 A | 8/1999 | Petrovic | |
| 5,943,422 A | 8/1999 | Van Wie et al. | |
| 5,945,932 A | 8/1999 | Smith | |
| 5,978,773 A | 11/1999 | Hudetz et al. | |
| 5,978,791 A | 11/1999 | Farber et al. | |
| 5,982,956 A | 11/1999 | Lahmi | |
| 5,983,176 A | 11/1999 | Hoffert et al. | |
| 5,986,651 A | 11/1999 | Reber et al. | |
| 5,986,690 A * | 11/1999 | Hendricks | 725/60 |
| 5,986,692 A | 11/1999 | Logan et al. | |
| 5,991,500 A | 11/1999 | Kanota et al. | |
| 5,991,737 A | 11/1999 | Chen | |
| 5,991,876 A | 11/1999 | Johnson et al. | |
| 5,995,105 A | 11/1999 | Reber et al. | |
| 6,005,501 A | 12/1999 | Wolosewicz | |
| 6,028,960 A | 2/2000 | Graf et al. | |
| 6,081,629 A | 6/2000 | Browning | |
| 6,081,827 A | 6/2000 | Reber et al. | |
| 6,081,830 A | 6/2000 | Schindler | |
| 6,084,528 A | 7/2000 | Beach et al. | |
| 6,088,455 A | 7/2000 | Logan et al. | |
| 6,098,106 A | 8/2000 | Philyaw et al. | |
| 6,121,530 A | 9/2000 | Sonoda | |
| 6,122,403 A | 9/2000 | Rhoads | |
| 6,122,526 A | 9/2000 | Parulski et al. | |
| 6,138,151 A | 10/2000 | Reber et al. | |
| 6,157,721 A | 12/2000 | Shear et al. | |
| 6,164,534 A | 12/2000 | Rathus et al. | |
| 6,169,541 B1 | 1/2001 | Smith | |
| 6,181,817 B1 | 1/2001 | Zabih | |
| 6,185,316 B1 | 2/2001 | Buffam | |
| 6,185,683 B1 | 2/2001 | Ginter et al. | |
| 6,199,048 B1 | 3/2001 | Hudetz et al. | |
| 6,201,879 B1 | 3/2001 | Bender et al. | |
| 6,219,787 B1 | 4/2001 | Brewer | |
| 6,243,480 B1 | 6/2001 | Zhao et al. | |
| 6,282,362 B1 | 8/2001 | Murphy et al. | |
| 6,286,036 B1 | 9/2001 | Rhoads | |
| 6,304,523 B1 | 10/2001 | Jones et al. | |
| 6,311,214 B1 | 10/2001 | Rhoads | |
| 6,314,457 B1 | 11/2001 | Schena et al. | |
| 6,317,881 B1 | 11/2001 | Shah-Nazaroff et al. | |
| 6,321,992 B1 | 11/2001 | Knowles et al. | |
| 6,324,573 B1 | 11/2001 | Rhoads | |
| 6,330,335 B1 | 12/2001 | Rhoads | |
| 6,345,104 B1 | 2/2002 | Rhoads | |
| 6,386,453 B1 | 5/2002 | Russell et al. | |
| 6,389,055 B1 | 5/2002 | August et al. | |
| 6,408,331 B1 | 6/2002 | Rhoads | |
| 6,411,725 B1 | 6/2002 | Rhoads | |
| 6,415,280 B1 | 7/2002 | Farber et al. | |
| 6,433,946 B2 | 8/2002 | Ogino | |
| 6,434,561 B1 | 8/2002 | Durst, Jr. et al. | |
| 6,439,465 B1 | 8/2002 | Bloomberg | |
| 6,442,285 B2 | 8/2002 | Rhoads et al. | |
| 6,466,670 B1 | 10/2002 | Tsuria et al. | |
| 6,496,802 B1 | 12/2002 | van Zoest et al. | |
| 6,505,160 B1 | 1/2003 | Levy | |
| 6,522,769 B1 | 2/2003 | Rhoads et al. | |
| 6,523,175 B1 | 2/2003 | Chan | |
| 6,526,449 B1 | 2/2003 | Philyaw et al. | |
| 6,542,927 B2 | 4/2003 | Rhoads | |
| 6,542,933 B1 | 4/2003 | Durst, Jr. et al. | |

| Patent Number | Date | Inventor |
|---|---|---|
| 6,553,129 B1 | 4/2003 | Rhoads |
| 6,577,746 B1 | 6/2003 | Evans et al. |
| 6,614,914 B1 | 9/2003 | Rhoads |
| 6,658,568 B1 | 12/2003 | Ginter et al. |
| 6,674,876 B1 | 1/2004 | Hannigan et al. |
| 6,674,993 B1 | 1/2004 | Tarbouriech |
| 6,681,028 B2 | 1/2004 | Rodriguez et al. |
| 6,748,360 B2 | 6/2004 | Pitman |
| 6,748,533 B1 | 6/2004 | Wu |
| 6,768,980 B1 | 7/2004 | Meyer et al. |
| 6,771,885 B1 | 8/2004 | Agnihotri |
| 6,772,124 B2 | 8/2004 | Hoffberg et al. |
| 6,807,534 B1 | 10/2004 | Erickson |
| 6,829,368 B2 | 12/2004 | Meyer et al. |
| 6,834,308 B1 | 12/2004 | Ikezoye |
| 6,850,252 B1 | 2/2005 | Hoffberg |
| 6,856,977 B1 | 2/2005 | Adelsbach |
| 6,868,497 B1 | 3/2005 | Levy |
| 6,931,451 B1 | 8/2005 | Logan |
| 6,941,275 B1 | 9/2005 | Swierczek |
| 6,968,337 B2 | 11/2005 | Wold |
| 6,973,669 B2 | 12/2005 | Daniels |
| 6,975,746 B2 | 12/2005 | Davis et al. |
| 6,987,862 B2 | 1/2006 | Rhoads |
| 6,990,453 B2 | 1/2006 | Wang |
| 7,035,427 B2 | 4/2006 | Rhoads |
| 7,047,413 B2 | 5/2006 | Yacobi et al. |
| 7,050,603 B2 | 5/2006 | Rhoads et al. |
| 7,058,697 B2 | 6/2006 | Rhoads |
| 7,127,744 B2 | 10/2006 | Levy |
| 7,158,654 B2 | 1/2007 | Rhoads |
| 7,171,018 B2 | 1/2007 | Rhoads et al. |
| 7,194,752 B1 | 3/2007 | Kenyon |
| 7,248,717 B2 | 7/2007 | Rhoads |
| 7,266,704 B2 | 9/2007 | Levy |
| 7,289,643 B2 | 10/2007 | Brunk et al. |
| 7,302,574 B2 | 11/2007 | Conwell |
| 7,333,957 B2 | 2/2008 | Levy et al. |
| 7,349,552 B2 | 3/2008 | Levy et al. |
| 7,359,528 B2 | 4/2008 | Rhoads |
| 7,362,781 B2 | 4/2008 | Rhoads |
| 7,362,879 B2 | 4/2008 | Evans |
| 7,369,676 B2 | 5/2008 | Hein |
| 7,372,976 B2 | 5/2008 | Rhoads et al. |
| 7,377,421 B2 | 5/2008 | Rhoads |
| 7,437,430 B2 | 10/2008 | Rhoads |
| 7,444,353 B1 | 10/2008 | Chen et al. |
| 7,461,136 B2 | 12/2008 | Rhoads |
| 2001/0007130 A1 | 7/2001 | Takaragi |
| 2001/0011233 A1 | 8/2001 | Narayanaswami |
| 2001/0026618 A1 | 10/2001 | Van Wie et al. |
| 2001/0026629 A1 | 10/2001 | Oki |
| 2001/0031066 A1 | 10/2001 | Meyer et al. |
| 2001/0032312 A1 | 10/2001 | Runje et al. |
| 2001/0044824 A1 | 11/2001 | Hunter et al. |
| 2001/0051915 A1 | 12/2001 | Ueno et al. |
| 2001/0055391 A1 | 12/2001 | Jacobs |
| 2002/0010826 A1 | 1/2002 | Takahashi et al. |
| 2002/0021805 A1 | 2/2002 | Schumann et al. |
| 2002/0021822 A1 | 2/2002 | Maeno |
| 2002/0023020 A1 | 2/2002 | Kenyon et al. |
| 2002/0023148 A1 | 2/2002 | Ritz et al. |
| 2002/0023218 A1 | 2/2002 | Lawandy et al. |
| 2002/0028000 A1 | 3/2002 | Conwell et al. |
| 2002/0032698 A1 | 3/2002 | Cox |
| 2002/0032864 A1 | 3/2002 | Rhoads |
| 2002/0037083 A1 | 3/2002 | Weare et al. |
| 2002/0040433 A1 | 4/2002 | Kondo |
| 2002/0044659 A1 | 4/2002 | Ohta |
| 2002/0048224 A1 | 4/2002 | Dygert |
| 2002/0052885 A1 | 5/2002 | Levy |
| 2002/0059208 A1 | 5/2002 | Abe |
| 2002/0068987 A1 | 6/2002 | Hars |
| 2002/0069107 A1 | 6/2002 | Werner |
| 2002/0072982 A1 | 6/2002 | Barton et al. |
| 2002/0072989 A1 | 6/2002 | Van De Sluis |
| 2002/0075298 A1 | 6/2002 | Schena et al. |
| 2002/0082731 A1 | 6/2002 | Pitman et al. |
| 2002/0083123 A1 | 6/2002 | Freedman et al. |
| 2002/0087885 A1 | 7/2002 | Peled |
| 2002/0088336 A1 | 7/2002 | Stahl |
| 2002/0099555 A1 | 7/2002 | Pitman et al. |
| 2002/0102966 A1 | 8/2002 | Lev et al. |
| 2002/0118864 A1 | 8/2002 | Kondo et al. |
| 2002/0126872 A1 | 9/2002 | Brunk et al. |
| 2002/0133499 A1 | 9/2002 | Ward et al. |
| 2002/0138744 A1 | 9/2002 | Schleicher et al. |
| 2002/0150165 A1 | 10/2002 | Huizer |
| 2002/0152388 A1 | 10/2002 | Linnartz et al. |
| 2002/0153661 A1 | 10/2002 | Brooks et al. |
| 2002/0161741 A1 | 10/2002 | Wang et al. |
| 2002/0168082 A1 | 11/2002 | Razdan |
| 2002/0174431 A1 | 11/2002 | Bowman et al. |
| 2002/0178410 A1 | 11/2002 | Haitsma et al. |
| 2002/0184505 A1 | 12/2002 | Mihcak et al. |
| 2003/0018709 A1 | 1/2003 | Schrempp et al. |
| 2003/0028796 A1 | 2/2003 | Roberts et al. |
| 2003/0037010 A1 | 2/2003 | Schmelzer |
| 2003/0051252 A1 | 3/2003 | Miyaoku |
| 2003/0101162 A1 | 5/2003 | Thompson et al. |
| 2003/0120679 A1 | 6/2003 | Kriechbaum et al. |
| 2003/0135623 A1 | 7/2003 | Schrempp et al. |
| 2003/0167173 A1 | 9/2003 | Levy et al. |
| 2003/0174861 A1 | 9/2003 | Levy et al. |
| 2003/0197054 A1 | 10/2003 | Eunson |
| 2004/0049540 A1 | 3/2004 | Wood |
| 2004/0145661 A1 | 7/2004 | Murakami et al. |
| 2004/0169892 A1 | 9/2004 | Yoda |
| 2004/0199387 A1 | 10/2004 | Wang |
| 2004/0201676 A1 | 10/2004 | Needham |
| 2004/0223626 A1 | 11/2004 | Honsinger et al. |
| 2005/0043018 A1 | 2/2005 | Kawamoto |
| 2005/0058319 A1 | 3/2005 | Rhoads et al. |
| 2005/0108242 A1 | 5/2005 | Kalker et al. |
| 2005/0144455 A1 | 6/2005 | Haitsma |
| 2005/0229107 A1 | 10/2005 | Hull et al. |
| 2005/0267817 A1 | 12/2005 | Barton et al. |

FOREIGN PATENT DOCUMENTS

| | | |
|---|---|---|
| EP | 493091 | 7/1992 |
| EP | 0642060 | 3/1995 |
| EP | 953938 | 11/1999 |
| EP | 0967803 | 12/1999 |
| EP | 1173001 | 1/2002 |
| EP | 1199878 | 4/2002 |
| JP | 5-037795 | 2/1993 |
| JP | 8-050598 | 2/1996 |
| JP | 11265396 | 9/1999 |
| WO | WO9743736 | 11/1997 |
| WO | WO98/03923 | 1/1998 |
| WO | WO99/35809 | 7/1999 |
| WO | WO00/58940 | 10/2000 |
| WO | WO00/70585 | 11/2000 |
| WO | WO 01/01331 | 1/2001 |
| WO | WO01/15021 | 3/2001 |
| WO | WO01/20483 | 3/2001 |
| WO | WO01/20609 | 3/2001 |
| WO | WO01/62004 | 8/2001 |
| WO | 0172030 | 9/2001 |
| WO | WO01/71517 | 9/2001 |
| WO | WO0172030 | 9/2001 |
| WO | 0175794 | 10/2001 |
| WO | WO01/75629 | 10/2001 |
| WO | WO02/11123 | 2/2002 |
| WO | WO0219589 | 3/2002 |

| | | |
|---|---|---|
| WO | WO02/27600 | 4/2002 |
| WO | 02082271 | 10/2002 |

OTHER PUBLICATIONS

U.S. Appl. No. 09/343,104, filed Jun. 29, 1999, Rodriguez et al.
U.S. Appl. No. 09/476,686, filed Dec. 30, 1999, Rhoads et al.
U.S. Appl. No. 60/257,822, filed Dec. 21, 2000, Aggson et al.
U.S. Appl. No. 60/263,490, filed Jan. 22, 2001, Brunk et al.
U.S. Appl. No. 60/175,159, filed Jan. 7, 2000, Derose et al.
U.S. Appl. No. 60/178,028, filed Jan. 26, 2000, Meyer et al.
U.S. Appl. No. 60/191,778, filed Mar. 24, 2000, Ramos.
Lin, et al., "Generating Robust Digital Signature for Image/Video Authentication," Proc. Multimeida and Security workshop at ACM Multimedia'98, Sep. 1, 1998, pp. 49-54.
Ghias et al, Query by Humming: Musical Information Retrieval In An Audio Database. In ACM Multimedia, pp. 231-236, Nov. 1995.
Kageyama et al, Melody Retrieval with Humming, Proceedings of Int. Computer Music Conference (ICMC), 1993.
Muscle Fish press release, Muscle Fish's Audio Search Technology to be Encapsulated into Informix Datablade Module, Jul. 10, 1996.
Wold et al, Content-Based Classification, Search, and Retrieval of Audio, IEEE Multimedia Magazine, Fall, 1996.
Digimarc, "Frequently Asked Questions About Digimarc Signature Technology," Aug. 1995.
Foote, "An Overview of Audio Information Retrieval," Multimedia Systems, v.7 n.1, p. 2-10, Jan. 1999.
Highwater FBI Ltd., "FBI Presentation: Image Copyright Protection Software," Jul. 1995.
Highwater FBI, "Copyright Protection for Digital Images, Digital Fingerprinting from FBI," Brochure, 4 pp., 1995.
Smith, et al, "Music Information Retrieval Using Audio Input," Proc. AAAI Spring Symposium on Intelligent Integration and Use of Text, Image, Video and Audio Corpora. pp. 12-16, 1997.
Blackburn, "A Tool for Content Based Navigation of Music," ACM Multimedia 98.
deRoure, "Multiagent System for Content Based Navigation of Music." ACM Multimedia, Oct. 99, 4 pp.
Sep. 18, 2000 Communication (Search Report) from th European Patent Office in Assignee's European Patent Application No. 97 924 752.5 (published as EP1019868).
Nov. 18, 2005 Communication from the European Patent Office in Assignee's European Patent Application No. 97 924 752.5 (published as EP1019868), and Assignee's May 26, 2006 Response thereto.
Jun. 6, 2007 Summons to attend oral proceedings from the European Patent Office in Assignee's European Patent Application No. 97 924 752.5 (published as EP 1019868), and Assignee's Dec. 20, 2007 Response thereto.
Allowed Claims from assignee's Japanese patent application No. 2004-224727 (published as JP 3949679); and Mar. 24, 2006 Notice of Reason(s) For Rejection (English Translation) in the JP 2004-224727 application.
Allowed Claims from assignee's Japanese patent application No. 2004-224727 (published as JP 3949679); and Mar. 24, 2006 Notice of Reason(s) For Rejection (English Translation) in the JP 2004-224727 application.
Mar. 31, 2008 Notice of Allowance (including Examiner's search history), and Feb. 21, 2008 Amendment, each from assignee's U.S. Appl. No. 11/265,544 (published as US 2006-0136565 A1).
May 26, 2006 Response to the Nov. 18, 2005 Communication from the EPO in Assignee's European Patent Application No. 97 924 752.5.
U.S. Appl. No. 60/222,023, filed Jul. 31, 2000.
Sep. 27, 2000 Specification; Jul. 15, 2008 Amendment, and Nov. 28, 2008 non-final Office Action; all from U.S. Appl. No. 09/671,571, Sep. 27, 2000.
Jun. 16, 2008 Information Disclosure Statement letter from assignee's U.S. Appl. No. 10/823,997 (published as US 2005-0058319 A1).
Feb. 2, 2009 Supplemental Response; Jan. 15, 2009 Supplemental Response; Jan. 14, 2009 Examiner Interview Summary; Jan. 13, 2009 Amendment (including interview summary) and Terminal Disclaimer; Dec. 23, 2008 non-final Office Action; Nov. 14, 2008 Amendment and Terminal Disclaimer; Oct. 31, 2008 non-final Office Action; all from assignee's U.S. Appl. No. 11/927,075 (published US 2008-01239182 A1).
Feb. 11, 2009 Preliminary Amendment from assignee's U.S. Appl. No. 11/867,480 (published as US 2008-0140714 A1).
Oct. 31, 2008 Notice of Allowance (including Examiner-Initiated Interview Summary); Jun. 16, 2008 Applicant Summary of interview and Terminal Disclaimer; Jun. 3, 2008 Examiner Interview Summary; Apr. 28, 2008 Amendment; Nov. 27, 2007 non-final Office Action; all from assignee's U.S. Appl. No. 10/823,997 (published as US 2005-0058319 A1).
Johnson, et al., "Bridging the Paper and Electronic Worlds: The Paper User Interface", Interchi '93, pp. 507-512, Apr. 1993.
Namba, S. et al., "A Program Identification Code Transmission System Using Low-Frequency Audio Signals." NHK Laboratories Note, Ser. No. 314, Mar. 1985.
Newman, William, et al. "A Desk Supporting Computer-Based Interaction with paper Documents," ACM Conference on Human Factors in Computing Systems (CHI '92) May 3-7, 1992, pp. 587-592.
P.C.J. Hill, "Simultaneous Subliminal Signalling in Conventional Sound Circuits." BBC Engineering, No. 90, pp. 14-31, 1972.
Peairs, "Iconic Paper." Proceedings of the Third International Conference on Document Analysis and Recognition (ICDAR '95), pp. 1174-1179, 1995.
Roy, "Wearable Audio Computer—A Survey of Interaction Techniques," MIT Media Lab, 1997.
Smith, et al. "Music Information Retrieval Using Audio Input." Proc AAAI Spring Symposium on Intelligent Integration and Use of Text, Image, Video and Audio Corpora, pp. 12-16, 1996.
Steele, R. et al., "Embedding Data in Speech using Scrambling Techniques." IEEE International Conference on Acoustics, Speech and Signal Processing, vol. 3, May 1982.
Steele, R. et al., "Simultaneous Transmission of Speech and Data Using Code-Breaking Techniques." The Bell System Tech. Jour., vol. 60, No. 9, pp. 2081-2105, Nov. 1981.
Ien Kate, et al., "Digital Audio Carrying Extra Information." Philips Research Labs, pp. 1097-1100, IEEE 1990.
Wagner. "Fingerprinting," 1983 IEEE, pp. 18-22.
Whittaker, et al., "Back to the Future: Pen and Paper Technology Supports Complex Group Coordination," CHI '95, Conference on Human Factors in Computing Systems, Denver, Colorado (May 7-11, 1995) (text copy obtained from ACM).
Zhao, "A WWW Service to Embed and Prove Digital Copyright Watermarks," Proc. of the European Conference on Multimedia Applications, Services and Techniques, May 1996, 15 pages.
Zhao, et al., "Embedding Robust Labels into Images for Copyright Protection," Proceedings of International Congress on Intellectual Property Rights for Specialized Information, Knowledge and New Technology, Aug. 21, 1995.

* cited by examiner

SYSTEMS AND METHODS OF MANAGING AUDIO AND OTHER MEDIA

RELATED APPLICATION DATA

This patent application is a continuation of U.S. patent application Ser. No. 09/769,017, filed Jan. 24, 2001 (issuing on Dec. 7, 2004 as U.S. Pat. No. 6,829,368). The Ser. No. 09/769,017 application claims the benefit of U.S. Provisional Application No. 60/178,028, filed Jan. 26, 2000. The Ser. No. 09/769,017 application is also a continuation-in-part of U.S. patent application Ser. No. 09/563,664, filed May 2, 2000 (now U.S. Pat. No. 6,505,160). These patent documents are hereby incorporated by reference.

The subject matter of the present application is related to that disclosed in U.S. Pat. Nos. 5,862,260 and 6,122,403; PCT Applications Nos. WO 01/01331 A1, published Jan. 4, 2001, and WO 00/70585, published Nov. 23, 2000; and in co-pending U.S. patent application Ser. Nos. 09/292,569, filed Apr. 15, 1999; 09/343,104, filed Jun. 29, 1999; 09/473,396, filed Dec. 28, 1999. (now U.S. Pat. No. 6,577,746); 09/476,686, filed Dec. 30, 1999; 09/503,881, filed Feb. 14, 2000 (now U.S. Pat. No. 6,614,914); Ser. No. 09/525,865, filed Mar. 15, 2000 (now U.S. Pat. No. 6,611,607); U.S. Ser. No. 09/547,664, filed Apr. 12, 2000; 09/574,726, filed May 18, 2000; and Provisional Application No. 60/191,778, filed Mar. 24, 2000. Each of these documents is hereby incorporated by reference.

TECHNICAL FIELD

The invention relates to linking audio and other multimedia data objects with metadata and actions via a communication network, e.g., computer, broadcast, wireless, etc.

BACKGROUND AND SUMMARY

Developments in network technology and media content (e.g., images, video, and audio) storage, delivery, and playback are re-shaping the entertainment, information technology, and consumer electronics industries. With these developments, there are an increasing number of applications for associating media content with auxiliary data. The auxiliary data may provide information describing the content, copy control information or instructions, links to related content, machine instructions, etc. This auxiliary data is sometimes referred to as metadata. In many applications, metadata suffers from the drawback that it is vulnerable to becoming separated from an associated media signal.

Steganography provides a way to embed data in the media signal. As such, it offers an advantage over conventional ways to associate metadata with media signals. Examples of steganography include digital watermarking and data glyphs. Exemplary watermarking techniques suitable for still image and video content are shown in U.S. Pat. Nos. 5,862,260 to Rhoads and 5,915,027 to Cox. Exemplary watermarking techniques suitable for use with audio content are shown in the just-cited Rhoads patent, as well as U.S. Pat. Nos. 5,945,932 to Smith and 5,940,135 to Petrovic.

Advances in computer and wireless networking, multimedia coding, and higher bandwidth communication links are creating many new ways to distribute and enjoy multimedia content, such as music and movies. Coding formats for audio like MPEG 1 Layer 3. (MP3) have already caused significant changes in music delivery to consumers. Despite the advances in technology, content distributors and broadcasters still need to address how to effectively promote and sell content.

This document describes systems and processes for linking audio and other multimedia data objects with metadata and actions via a communication network, e.g., computer, broadcast, wireless, etc. Media objects are transformed into active, connected objects via identifiers embedded into them or their containers. These identifiers can be embedded by the owner or distributor of the media object, or automatically created from the media object. In the context of a user's playback experience, a decoding process extracts the identifier from a media object and possibly additional context information and forwards it to a server. The server, in turn, maps the identifier to an action, such as returning metadata, re-directing the request to one or more other servers, requesting information from another server to identify the media object, etc. If the identifier has no defined action, the server can respond with an option for the user to buy the link and control the resulting action for all objects with the current identifier. The linking process applies to broadcast objects as well as objects transmitted over networks in streaming and compressed file formats.

Further features will become apparent with reference to the following detailed description and accompanying drawings.

DETAILED DESCRIPTION

Figure 1:
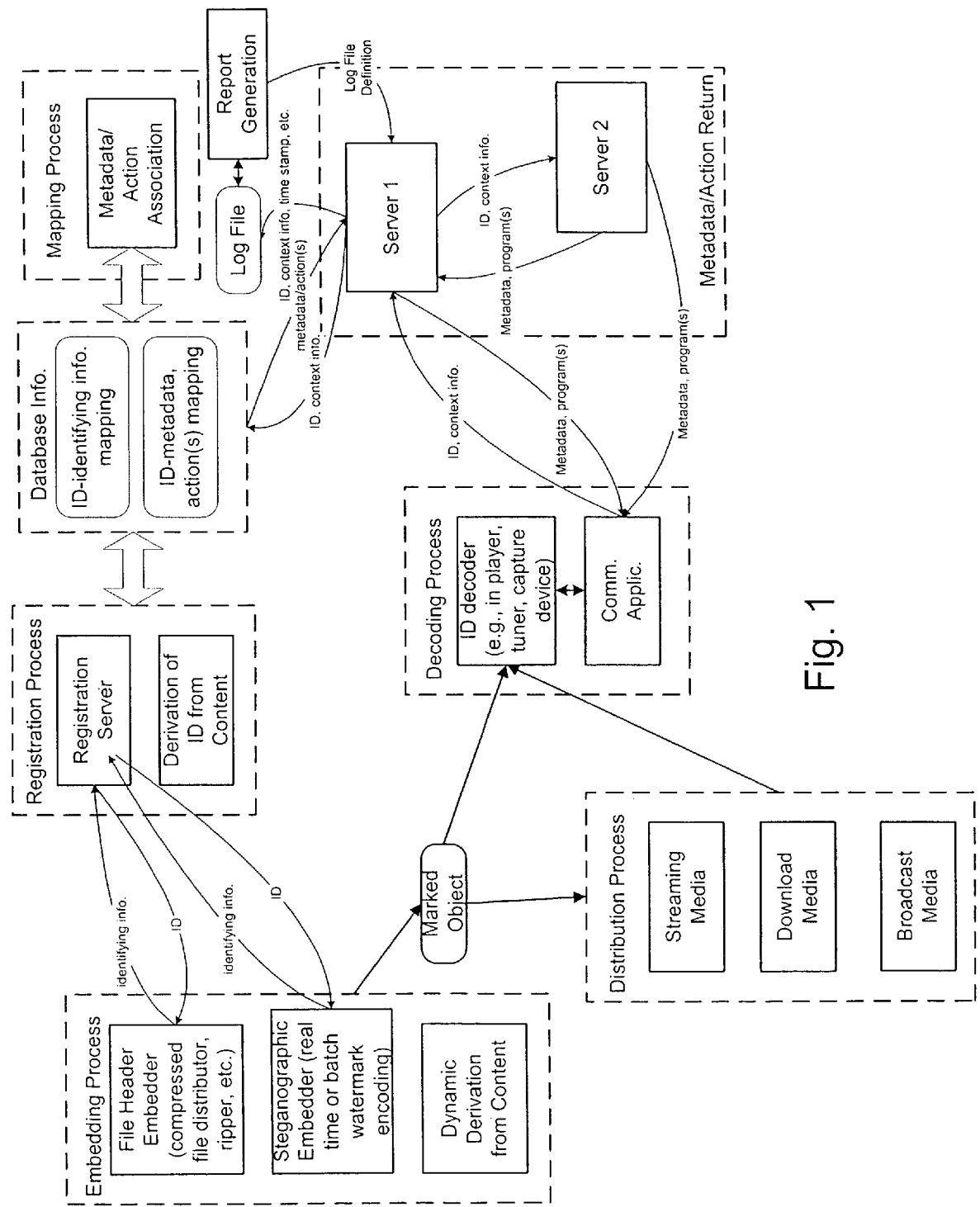
FIG. 1 is a diagram illustrating examples of media object linking processes and systems.

Linking Audio and Other Media Objects via Identifiers

The following sections describe systems and processes for linking audio and other media objects to metadata and actions via an identifier. For the sake of illustration, the disclosure focuses on a specific media type, namely audio signals (e.g., music, sound tracks of audio visual works, voice recordings, etc.). However, these systems, their components and processes apply to other types of media signals as well, including video, still images, graphical models, etc. As described further below, an identifier attached to an audio signal is used to connect that signal with metadata and/or programmatic or device actions. In the context of this document, the terms "media object" and "audio object" refer to an electronic form of a media signal and audio signal, respectively. The linking of media signals applies to objects that are transmitted over wire. networks (such as a computer network), wireless networks (such as a wireless telephone network), and broadcast (AM, FM, digital broadcast, etc.).

There are a number of ways to associate an identifier with an audio object. One way to associate the identifier is to insert it in the form of a numeric or alphanumeric. code (e.g., binary or M-ary code) in the electronic file in which the audio is stored. Another way to associate the identifier is to embed it as auxiliary data in the audio signal using steganographic methods, such as digital watermarking or other data hiding techniques. Yet another way is to derive the identifier from the audio signal, the table of contents, the file system structure, or its container (e.g., an electronic file or physical package for data like flash memory, Digital Versatile Disk (DVD), minidisk, or compact disk (CD). The physical media may have identifying characteristics, such as a unique identifier or encoded metadata, or other attributes from which an identifier can be derived (e.g., CD disk wobble).

When the identifier is associated with metadata or actions, it transforms the media object into a "linked" object. The identifier travels with the object through distribution, including in some cases, through physical distribution in packaged media and through electronic distribution (broadcast or network communication). The. identifier may travel within the same band as the audio object, such as a watermark, or via a separate band, such as a file header or footer or separate broadcast band. A decoding device or programmatic process extracts the identifier from the object and uses it to retrieve related data or actions ("metadata"). In the case of an audio object, like a song, the metadata typically includes the title, artist, lyrics, copyright owner, sound recording owner, information about buying or sampling opportunities and URLs to this type of data as well as web sites and other programs and devices. Linked actions include device or programmatic processes for electronically establishing a license, transferring content (either streaming or download), sending an email, recording marketing data about a transaction, etc. The identifier allows a fan of a particular type of music or artist to get more information about the music and to buy more music. From the perspective of the artists and record labels, the identifier provides an additional opportunity to promote their music and sell content, concert tickets, etc.

In addition, in some implementations where identifier linking transactions are monitored, it enables the vendors of music to gather data about electronic transactions triggered by the link. For example, users of information may choose to provide information about themselves when they register their decoding device or software with the system. A user ID or other context information may then be recorded when the identifier is extracted and used to trigger a transaction. Many entities involved in the distribution of media signals can benefit from the linking capability. Artists can link their music to information about themselves and provide electronic buying opportunities for music, concert tickets, clothing, etc. Rights holding organizations can use the link to inform users about itself and licensing opportunities. In some cases, the link may also be used to monitor playing and distribution of copies of the music. Record labels can link their music to information about the artist, the label, electronic buying opportunities, etc. Electronic retailers can increase sales by linking users to opportunities to sample and buy additional music (via download or streaming delivery over a wire or wireless network). Conventional brick and mortar retailers can use linking to provide information about the music and to provide buying opportunities. Radio stations and other broadcasters can use the linking capability to bring users to their web sites, creating advertising revenue, to provide electronic buying opportunities for music, concert tickets, clothing items, etc. These and other forms of linked metadata and actions may be implemented in various combinations in different application scenarios.

Depending on the application, the identifier may identify the media object in which it is embedded, or entities, things or actions other than that particular media object. One type of identifier is an object ID that identifies an audio object. This identifier may be a number associated with the object, such as its International Standard Recording Code (ISRC). Another type of identifier is distributor ID that identifies the distributor of the audio object. Another type of identifier is a broadcaster ID that identifiers the broadcaster of the audio object. Of course, more than one identifier may be encoded into an audio object or its container. In the event that an object ID is not encoded with an audio object, but instead, a distributor or broadcaster identifier is encoded with the object, other context information, such as the time of play back or distribution, location of distribution, etc. may be used to identify the audio object as part of the linking process. An example is a radio station that marks its broadcasts with a station ID and maintains a playlist database with the air times of each audio object. At decoding time, the station ID is extracted and used along with context information such as the air time of the audio object to look up the audio object or its corresponding metadata and actions. This approach enables the linking system to provide audio object specific metadata or actions even without requiring a unique object identifier in every audio object.

System Implementation

FIG. 1 is a diagram of a system configuration of linked media objects. In this configuration, an identifier links audio objects to metadata via an electronic network, such as the Internet, a wireless network, or a broadcast network. As depicted in FIG. 1, an embedding process may be used to encode an identifier in an audio object or its container. In some cases, an embedding process encodes the identifier in the audio file (e.g., a tag in a file header or footer), in the audio signal (a digital watermark), or in the physical packaging. The identifier may also be derived as a function of the audio signal or other information in the file or physical packaging (e.g., track information on a CD). In the case of dynamically derived identifiers, an embedding process is not necessary because the identifier can be derived from the content at decoding time.

In some application scenarios, the embedding process interacts with a registration process to get an identifier. The embedding process provides information about the object (e.g., a title and artist name, an ISRC, name of distributor, etc.). In response, the registration process provides an identifier and stores a database record of the association between identifier and the object or other information used-in decoding to identify the object, such as its distributor or broadcaster. The registration process may be used to assign an identifier to an audio object and to distributors or broadcasters of audio objects. The embedding and registration processes may occur before the audio object is distributed to consumers, or sometime thereafter, such as when a user transfers (e.g., "rips") a media object from one format to another (e.g., a packaged format to an electronic file format such as a compressed file format).

Once registered, an interactive or automated mapping process associates the identifier with data or actions. The registration process creates a database of identifiers and associates the identifiers with corresponding media objects, distributors, broadcasters, etc. The mapping process associates the identifiers with corresponding metadata or actions.

Once associated with an audio object and metadata, the identifier transforms the audio object into a linked object. The identifier remains with the object through distribution, although some embedding processes are more robust than others to intentional or unintentional distortion/removal of the identifier. There are a variety of different distribution scenarios. Some examples depicted in FIG. 1 include transferring an audio object over a computer network, streaming the object over a computer network, or broadcasting it (e.g., AM/FM broadcasting, digital broadcasting, broadcasting over wireless carriers, etc.). Whatever the distribution process, a user ultimately receives the linked object in a player, tuner, or capture device.

To activate the linked object, a decoding process extracts the identifier and uses it to access associated data or actions.

The decoding process may be implemented as a separate program or device, or integrated into a player, tuner, or some other capture device, such as a listening devices that converts ambient audio waves to an electronic signal and then extracts the identifier from the signal.

In the configuration shown in FIG. 1, the decoding process forwards the extracted identifier to a communication application, which in turn, forwards it in a message to a server. The decoding process or the communication application may add additional context information to the message sent to the to a server. The context information may relate to the user, the user's device, the attributes of the session (time of playback, format of playback, type of distribution (e.g., broadcast or transmitted audio file), etc.) Based on identifier and optional context information, the server determines an associated action to perform, such as re-directing an identifier or context data to another server, returning metadata (including programs, content, etc.), downloading content, logging a transaction record. To find the associated action or actions, the server maps the identifier to actions based on the information established in the mapping process. The server may: 1) look up the data and actions in a local database stored in its memory subsystem; 2) route the identifier to one or more other servers via the network, which in turn look up related actions and data associated with the identifier; or 3) perform some combination of actions 1 and 2.

In the first case, server 1 returns data or actions associated with the identifier. The server may look up related data based on the identifier alone, or based on the identifier and other context information. Context information may be information provided by the user, by the user's computer or device, or by some other process or device. In the second case, the server looks up one or more addresses associated with the identifier and forwards the identifier and/or possibly other context data to secondary servers at these addresses via conventional networking protocols. Again, this context data may include data from the user, the user's computer, some other device or database. For example, server 1 might query a remote database for instructions about how to process an identifier. These instructions may specify data to return to the communication application or to forward to another server, which in turn, looks up associated data and returns it to the communication application. A server may return data that an audio player displays to the user or uses to control rendering of the content. For example, the server can tell the player that the object contains inappropriate content for children. The player or user can make decisions about whether or how to play the material based on this information.

Both the server and the player can adopt a set of rules. The server rules may be used to control what the server returns in response to an identifier and context data. The player rules may be used to control what the player displays to the user or how it renders the content based on data returned from a server.

Either the first server, or a server one or more levels of indirection from the identifier may return data and programmatic actions to a player via the communication application. Each server in these levels of indirection receives a database key, such as an identifier or context information, from the previous server, and uses it to look up corresponding actions. These actions may include returning data or programs to the communication application or to previous servers in the routing path of the message from the communication application. Also, the servers may route requests for information or actions to other servers. The server or servers may return data or perform actions in response to the identifier (or other context data) that do not directly impact the decoding process, or the device in which it operates.

The system depicted in FIG. 1 allows several different interested parties to establish services linked via the identifier. For example, server 1 can be configured to provide generic promotional and/or licensing information associated with an identifier. If the content owner, distributor, retailer, artist or other related party wishes to provide information or services for a connected object, then server 1 may also route the identifier for that object, and possibly context information, the address of the communication application, and instructions, to servers maintained by these entities. These servers, in turn, provide promotional, sales, or licensing information, and electronic buying or licensing opportunities specific to that entity back to the consumer over the network via the communication application.

In the context of a network configuration, Internet protocols may be used to return data to the communication application or to the device or system in which it operates. The communication application may be implemented in a web browser, such as Internet Explorer or Netscape Navigator. Examples of ways of exchanging information between a client player and a server include returning a web page with metadata and program scripts designed to run on the end user's system. The metadata itself may include active links, such as URLs to other network resources, such as a web site or some other network service. The path of the identifier from the decoding process, and the return path from a server to the communication application may include one or more hops through a wire or wireless connection using standard wire and wireless communication protocols like TCP/IP, HTTP, XML, WAP, Bluetooth, etc. In addition, data returned to the user may be routed through one or more servers that may forward the data, and in some cases, augment the data or modify it in some fashion.

Figure 2:
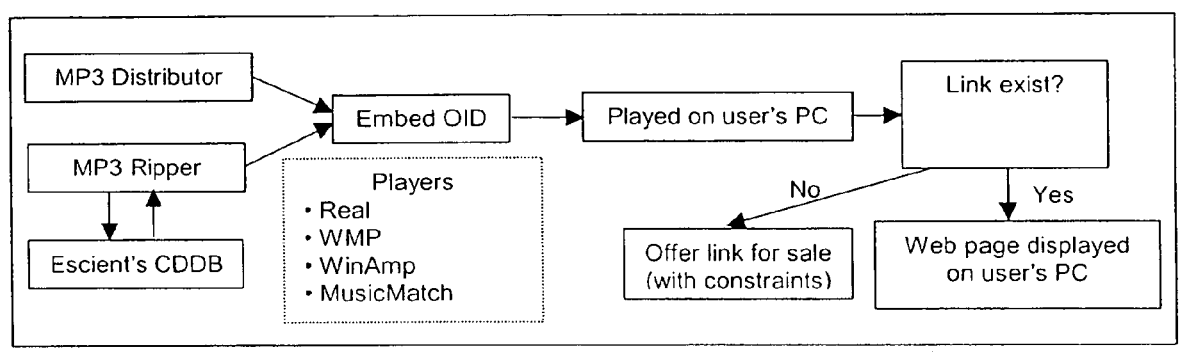
FIG. 2 is a diagram illustrating media object linking applications.

FIG. 2 is a diagram illustrating applications of the system depicted in FIG. 1. In the application scenarios depicted in FIG. 2, an embedding process encodes an object identifier (OID) into an audio file, such as an ID3 tag in the header of an MP3 file or audio frame headers in the MP3 file. FIG. 2 shows two embedding scenarios. The first is an MP3 distributor that embeds OIDs in MP3 files before transmitting them over a network, such as the Internet, typically via a web site interface. The second is a file ripping process where a programmed computer or other device extracts an audio object from packaged media such as a CD and converts it into a coded file format like MP3. In the latter case, the ripping process may extract metadata from the CD, such as the table of contents, and use this metadata as a key to a database (CDDB) to get information about the songs on the CD, such as title, artists, etc. The table of contents or other metadata from a package medium, such as optical or magnetic storage or flash memory, may be hashed into an index to a database entry that stores information about the media signal stored on the medium. The ripping process uses the information returned from the database to identify the audio objects on the packaged media so that they can be associated with an OID. This is an example of identifying information used to associate an OID with an audio object. As part of the coding process, the ripping process inserts the OID in the file header of the MP3 file.

Later, when a user opens or plays the marked MP3 in a player, such as a software player like the real player, Liquid Audio player, Windows Media Player (WMP), WinAmp, MusicMatch, etc., a plug-in software module in the player extracts the OID and forwards it to a server via an Internet connection. The plug-in may establish its own Internet connection, or pass the OID to an Internet Browser, which in turn, establishes a connection (if one is not already present) with the server. As an intermediate step, the plug-in may display a window with user options, such as "learn more about the song", "play the song", or both. The user can then choose to get more information by actuating the first or third options in the user interface window, which cause the plug-in to forward the OID to the server.

The server then returns a web page associated with the OID, or re-directs the OID to another server (e.g., one maintained by the content distributor or owner), which in turn, returns a web page of information about the object and links to related actions (e.g., a link to a licensing server, a link to a server for buying and downloading related music etc.). The licensing server may be programmed to download software players and new music offerings compatible with those players. For instance, the licensing server may provide software for decrypting, decoding, and playing electronically distributed music according to usage rules packaged with the electronically distributed music. In this application scenario, the linking of the MP3 file enables the content owner to market music and products that promote the sale of audio objects in other formats, included formats protected with encryption, watermark copy managements schemes, etc.

In the event that a media object is not linked, the decoding and server processes can be programmed to enable the user to purchase a link for the object. For example in one scenario, the player plug-in displays a graphic for a link information indicating that the link is available after determining that an OID is not in the file. If the user clicks on the graphic, the plug-in displays more information about the procedure for purchasing or renting a link. This information may be provided in conjunction with querying the server and displaying information returned from the server, or alternatively, providing pre-programmed information incorporated into the plug-in. If the user is interested in purchasing the link, he or she can then enter input (e.g., click on a button such as "Get Link") that initiates the process of registering an OID with the object and associating metadata or actions with the OID. The process of registering the OID and associating the OID with metadata or actions may be performed as described in this document. This scenario provides yet another mechanism for transforming content into connected content.

There are many possible variations to the applications scenarios illustrated in FIG. 2. During the file ripping process (or some other embedding process), the embedder may generate a unique ID from the metadata read from the packaged media on which the media object resides. One example of such an ID is the number derived from CD metadata currently used to index information in the CDDB database. This ID may then be embedded in the audio object or its file header/footer. During OID registration, the registration process may inform the embedding process that the OID (and thus, the object for which it was derived). has not been associated with metadata or actions. In this case, the user may be given an opportunity to purchase the link, either at the time of ripping, or in the future, wherever the object travels. In the latter case, the OID in the object is associated with an option to buy the link and customize the data and/or actions associated with that link. Rather than link to promotional information, the OID gives users an option to buy or rent the link and provides them with an opportunity to customize it (e.g., linking it to a custom web site). Once customized, other users that open or play the file will then be able to link to the customized information or actions.

To assert control over the type of customization that users may perform, the registration and mapping processes can place constraints on the types of metadata and actions that users can link to a media object.

In the multimedia content industry, there are typically many rights holders and entities involved in the distribution process. This may present a conflict when linking a media object to one entity. One way to address this problem is have an object link to many different entities. For example, the server could map an OID to many entities and return links to retailers, distributors, record labels and artists. Another way to address it is to encode additional information about the distributor in the OID. For example, the OID includes fields that identify the object and its distributor. If a user activates the link to purchase products, including media objects, then the distributor name is logged with the purchase and that distributor is credited with royalties associated with the transaction. The distributor field may also be used as a key to look up the appropriate action for the OID, such as re-directing the OID to the web server of the entity associated with that OID. In this approach, even if the OID directs a user to a record label's website, the distributor field can be used to credit the distributor with a royalty for the linking transaction.

The entity responsible for maintaining a web site linked via on identifier can make deals with online resources for providing data about a media object such as lyrics, song titles, radio station play lists. The website may link to this information, access it via a database manager, etc.

File Identifiers

One form of identifier is an identifier that is inserted in an audio object file, but in a distinct field from the audio signal itself. Some examples are file headers and footers. This file identifier may be assigned before or after distribution of the audio object to consumers. In addition, it may be derived from the audio signal or other information in the file. For example, an identifier generator may derive a unique or sufficiently unique identifier from a portion of a music signal. A variety of methods for generating a unique numbers based on a unique collection of numbers may be used.

The process of embedding a file identifier may be done at the time of encoding or transcoding a file. For example, the file identifier may be inserted during a ripping process, such as when a device or programmatic process converts a song from a format stored on packaged media, like a CD or DVD, to an electronic, and compressed form, such as MP3 or some other audio codec. As another example, the file identifier may be inserted when a device or programmatic process transcodes an electronic music file from one codec format to another. Yet another example is where a file is taken from a digital or analog uncompressed format, and placed in another format for distribution.

Identifiers Embedded in Audio Signal

Another way to associate an identifier with an audio signal is to embed the identifier in the audio signal using steganographic methods, such as digital watermarking or other data hiding techniques. Many of such techniques have been developed and are described in published articles and patents. Watermarking methods are described in U.S. Pat. No. 6,614,914. Other examples of methods for encoding and decoding auxiliary signals into audio signals include U.S. Pat. Nos. 5,862,260, 5,940,135 and 5,945,932. For more information on steganographic applications, see the patent applications incorporated by reference.

The steganographic embedding method may be performed in a batch process. Consider a distributor of electronic music via the Internet or some other network, or a broadcaster of music such as a radio station. In each case, the distributor and broadcaster have a collection of audio objects. The embedding process may operate on this collection of objects in a batch process by retrieving an electronic version, encoding an identifier obtained from the registration process, and returning the marked version for later distribution or broadcasting. In some cases, it is desirable to do watermark embedding in an iterative process in a studio environment to encode the watermark with an intensity that achieves desired perceptibility and robustness requirements.

The steganographic embedding method may also be performed at the time of transmission of an electronic file or broadcast of the audio object. In the case of distribution via a network such as the Internet (e.g., streaming or file download), real time embedding enables the embedding process to also embed context information that is specific to the consumer (or the consumer's computer) that has electronically ordered the object. For example, when the user requests a file in a streaming or a compressed file format via the Internet using her browser, the distributor's server can request information (perhaps voluntary) about the user to be associated with the transmitted object. Later, the decoding process or the servers that map the identifier to actions or metadata can use this information to determine the types of information to provide or responsive action to perform.

In the case of broadcasting, real time embedding enables the identifier to be steganographically embedded throughout an electronic version of the audio signal just before, or as part of the broadcasting process.

An object or distributor ID (as well as other identifiers or context information) can be embedded in the payload of a watermark that is also used for copy control. Portion of the watermark can be used to control whether the object can be played, transferred, recorded, etc., while another part can be used to carry identifiers and other metadata for linking functions described in this document. Alternatively, entirely separate watermark encoding and decoding methods may be used for copy control and linking functions.

A watermarking process may be used to encode different watermarks in the various channels of an audio signal. Message information may be embedded in one or more channels, while synchronization or orientation signals used to detect and decode the message information may be encoded in other channels. Also, different messages (e.g., different identifiers) may be encoded in different channels. At decoding time, the different identifiers can trigger different actions or link to different data.

In broadcasting applications, an identifier may be encoded along with the broadcast of the associated media signal by modulating a subcarrier of the main carrier frequency used to transmit the media signal. The subcarrier conveys auxiliary data such as the identifier, while the main carrier conveys the associated media signal. To reduce audibility of the auxiliary data (e.g., the identifier(s)) encoded in the sub-carrier, the data can be randomized by applying it to a pseudorandom or random number by some function that may be inverted in the decoding process, e.g., multiplication or exclusive OR functions. One example of sub-carrier encoding and decoding is Active HSDS 97 developed by Seiko Corporation.

Identifiers in Digital Radio Broadcasts

Some forms of digital radio broadcasts support transmission of metadata along with media signals. This metadata can also be used to carry one or more identifiers that are mapped to metadata or actions. The metadata can be encoded at the time of broadcast or prior to broadcasting. Decoding of the identifier may be performed at the digital receiver. In particular, the digital receiver receives the broadcast data, extracts the identifier, and either automatically, or at the user's direction, forwards the identifier to a server to look up the associated metadata or action.

Dynamic Identifier Extraction from Audio Content or Related Data

As noted above, another way to associate an identifier with a corresponding audio signal is to derive the identifier from the signal. This approach has the advantage that the embedding process is unnecessary. Instead, the decoding process can generate the identifier from the audio object. In this case, the decoder computes a fingerprint of the audio signal based on a specified fingerprinting algorithm. The fingerprint is a number derived from a digital audio signal that serves as a statistically unique identifier of that signal, meaning that there is a high probability that the fingerprint was derived from the audio signal in question. One component of fingerprint algorithm is a hash algorithm. The hash algorithm may be applied to a selected portion of a music file (e.g., the first 10 seconds) to create a fingerprint. It may be applied to discrete samples in this portion, or to attributes that are less sensitive to typical audio processing. Examples of less sensitive attributes include most significant bits of audio samples or a low pass filtered version of the portion. Examples of hashing algorithms include MD5, MD2, SHA, and SHA1.

As an aside, fingerprinting may also be used to determine whether an audio signal has been watermarked. The fingerprinting application can evaluate a fingerprint for a received object and compare it with one for a watermarked object (or unmarked object) to determine whether the object is likely to be watermarked. Certain fingerprints can be associated with certain types of watermark methods. Using the fingerprint, a decoding device can select an appropriate watermark decoding system for the object.

While specifically discussed in the context of audio objects, the fingerprinting process applies to other types of multimedia content as well, including still images, video, graphics models, etc. For still images and video, the identifier can be derived dynamically from a compressed or uncompressed version of the image or video signal. The fingerprinting process may be tuned to generate a specific identifier based on the type of file format. For example, the process extracts the file format from the file (e.g., from a header or footer), then uses a fingerprinting process tailored for that type of file (e.g., a hash of a compressed image or video frame). The dynamic identifier computed by this process may be associated with metadata and/or actions using the processes and systems described in this document.

Registration Process

One way to implement the registration process is to build client and server application programs that communicate over a computer network using standard network communication protocols. The client may be implemented as a software program that provides identifying information about an audio object. It can obtain the information by prompting the user for the identifying information, or from extracting it from the audio object or its container. The server may be implemented as a database management program that manages identifiers and corresponding audio objects. When queried to provide an identifier for particular identifying information, the program checks whether it has already assigned an identifier to an object based on the identifying information. If so, it returns that identifier that has already been assigned. If not, it assigns a new identifier number, creates a new entry in the database for that number and its associated identifying information.

The type of identifier used to link audio objects varies with the application. As such, the registration process may vary as well. One type of identifier is a unique identifier for an audio object. Another type of identifier is one that identifies some attribute of the audio object, but does not uniquely identify it, such as a distributor or broadcaster identifier. This type of identifier requires additional context information to uniquely identify the audio object at the time of linking it to actions or metadata. For these types of identifiers, the registration process provides information identifying the attribute of the audio object, such as its distributor or broadcaster. In response, the server provides an identifier that may be embedded in several audio objects that share that attribute.

One example is a broadcaster ID, such as a radio station ID. Audio broadcast by the radio station is embedded with this radio station ID. To identify the object, context information such as the play time captured at the tuner is used along with the radio station ID extracted from the received audio signal to identify the audio object. The decoding process forwards this information to a server. Using the radio station ID and context information, the server maps the ID to an appropriate action. This may include querying a radio station's playlist database for an object identifier based on the station ID and context information. The server can then map the object identifier to an action or metadata based on the object ID returned from the playlist database. Other scenarios are possible. For example, the server could forward the station ID, context data and decoder address to a radio station server, which in turn, looks up the appropriate action or metadata (e.g., web page) and sends it to the device that decoded the station ID.

Broadcast content can also be associated with object identifiers. One way to implement the identifier assignment process is to allocate a unique set of identifiers with each broadcaster/distributor. Those broadcasters or distributors are then free to assign the identifiers to media objects as they wish. Once they complete the identifier assignment process, they may then associate the identifiers with the metadata or actions in a mapping process.

Embedding Process

The embedding process may be integrated into a software program along with the client of the registration process described in the previous section. This integration of registration and embedding functions is particularly suited to a batch embedder, where processing time required to request an identifier is less of a concern.

In real time embedding, the identifier or identifiers are preferably available for associated audio objects before embedding begins. For example, the identifiers can be maintained in a local database on the embedding computer or device and indexed by object title. Distributor and broadcast identifiers are more straightforward because they may be applied to several different audio objects.

The embedding process may also be implemented in an embedding clearinghouse system. The embedding clearinghouse is a computer or other electronic system that analyzes media objects and embeds one or more links in the media objects. The clearinghouse may be implemented in a server on a network, such as the Internet and operate on content in a "push," "pull," or some combination of push and pull models. In the push model, users and other systems send media objects to the embedding clearinghouse for analysis and embedding. The pull model, the clearinghouse has the capability to search for and gather media objects for embedding and analysis. One example of this pull model is an Internet search process called a spider that crawls the Internet, searching for media objects to analyze and embed with one or more identifying links.

The embedding clearinghouse analyzes a media object (perhaps based on out of band data like a file header or footer) and inserts an identifier. This identifier may link to a metadata and actions, such as re-direction to a web site offering products, services, and information related to the content. The embedding clearinghouse may incorporate search engine technology to execute a key word search based on information from the media object and then associate the media object with a series of related URLs returned from the Internet search. The process may be automatic, or with some user input to select which sub-set of links should be inserted.

The embedding clearinghouse may also offer an identifier embedding services for those wanting to link their media objects with metadata, actions, etc. In this application scenario, the embedding clearinghouse may be implemented as an Internet server that is accessible via a web page using conventional network communication and web protocols. To access the server, users visit a web page using an Internet browser. In exchange for a fee, which may be tendered electronically over the Internet from the user's computer to the server, the server provides an embedding service to embed an identifier into a media object uploaded from the user via the user's computer and Internet connection. The user can select the information to associate with a media object, such as generic identifying information (e.g., title, author, owner), generic licensing information, or special information or actions. The provider of the embedding clearinghouse server hosts the generic information, while the special purpose information and actions are accessed through re-direction. In particular, the provider of the clearinghouse server links the embedded identifier to an address or set of addresses of servers that provide the special information or actions. Then at decoding time, the decoding process sends the identifier to the provider's server, which in turn, redirects the identifier to a secondary server or servers that provide special purpose information or actions (e.g., redirect to a web page of the content owner, download related content, provide electronic licensing services, etc.).

Decoding the ID and Embedded Context Data

The implementation details of the decoding process depend on how the identifier is encoded into an audio object or its container. In the case where the identifier is encoded in a file header or footer, the decoder may be a software program or digital hardware that parses the header/footer and forwards it to the communication application. One way to implement this type of decoder is to integrate it into a media player as a plug in program. Examples of media players include Windows Media Player from Microsoft, Liquid Audio player from Liquid Audio, Winamp, Real Player from Real Networks. Preferably, the plug-in gives the user visual feedback that the identifier has been detected and displays a window with options to access more information or actions available via the link. For example, the user can be presented with a user interfaces prompting the user to click for more information or buying opportunities. If the user selects these options, the plug-in forwards the user selections and identifier to the communication application, which forwards them to the server (e.g., server 1, FIG. 1).

In the case where the identifier is steganographically encoded in the audio object, a corresponding decoder extracts the identifier. This type of decoder may be implemented as a plug in to a software player as described in the previous paragraph. It may also be implemented in a tuner for broadcast content, or in a listening device that captures audio from the ambient environment.

In the case where the identifier is derived from the content or container metadata, the decoder captures the pertinent portion of the audio object, and generates the identifier as described above. This type of decoder can be implemented in a software or hardware player, a tuner, etc.

The decoder may collect identifiers in response to a user request while objects containing these identifiers are being played. For example, when the user is playing music, he may like a song and want to buy it or get more information. This feature may be implemented by building an interface that has a button or voice recognition that enables the user to request information or a buy/license opportunity. Once captured, identifiers can be forwarded along with user instructions to the appropriate server.

However, one particularly useful feature is to enable the user to fetch information and make orders from music as the music is playing. The system described previously supports this feature because the decoding process can forward the identifier or identifiers, embedded context information, or additional context information (user information, play time, broadcast type, file type, player type, operating system type) to the communication application as the music is playing. The user can trigger the linking action by pressing a "fetch" button, or saying fetch to a voice activated input device that causes the decoding device to package a message and invoke the communication application (e.g., Internet browser). In turn, the communication application forwards the message to a server that parses the message and determines the associated action.

The activation of the "fetch it" feature may be made on a handheld device that communicates with a decoding device in a tuner via a wireless connection. For example, a user may press a button on a remote control device, like a key chain, which sends a wireless signal to a receiver in the tuner. The receiver invokes the decoding process. The tuner may also send metadata from the server to the remote control device for display using a similar wireless connection. Infrared or RF transceivers, for example, may be used to communicate the data back and forth.

The decoding device may also provide continuous decoding of identifiers. When the user requests a "fetch," the identifier and context information for the current song may be forwarded to the server. Also, the decoding device may automatically fetch generic information such as song title and artist so that this information is immediately available to the user.

Another possible implementation is to temporarily buffer identifiers extracted from some predetermined number of the most recent songs, titles, etc. These identifiers can be stored along with other metadata, such as a time stamp, to inform the user when they were captured. The user can then select one or more of the items to send to the server for more information or related actions.

These features may be implemented in one or more devices. While the example above discusses a remote control device and a separate tuner with a decoder, these functions may be integrated into a single device, such as a car stereo, phone handset, personal digital assistant, and a variety of other types of players or tuners.

The identifier enables dynamic linking. Dynamic linking enables the identifier encoded with a media object to remain fixed, while the metadata or actions associated with that identifier can be changed. To change the associated metadata, the mapping process edits the identifier database to associate new metadata or actions with an identifier. The mapping process can be automated to change metadata or actions associated with an identifier at periodic intervals or in response to system events. In addition, a user may change the associated metadata or actions interactively at any time. To facilitate access to the database, a web-based interface can be added to the database.

Dynamically linked data returned from a server to a player environment can be displayed to the user in a variety of ways. One way is to display it in a web page or user interface window of a player. The data can be animated by scrolling it across the visual display. The data can also be displayed in the form of HTML links, which, when activated, cause the download of other data or initiate actions, such as playing streaming content from a server.

Server Types

As discussed elsewhere, the servers used to link identifiers to actions may be programmed to provide a variety of actions including:

returning data and HTML links (e.g., in the form of an HTML document, scripts, etc.)

downloading media signals in streaming or file format performing an electronic transaction (selling products like CDs, DVDs, concert tickets, etc. via computer transaction using credit cards, digital money, etc.)

establishing a license to use a linked media object re-directing to another server performing database look up operations for related information, links, actions performing database look up to uniquely identify a media object based on distributor/broadcaster ID and other context information creating a transaction log This is by no means in exhaustive list. Another type of server action is to initiate a process of searching a database, a collection of databases or the Internet for additional information related to a linked media object. This type of search service may be performed continuously and the results associated with the identifier. Then, in response to a request from a decoding process, the server can return a digest of the results with links to web pages for additional information.

Communication Application

The implementation details of the communication application are highly dependent on the type of communication link and protocols used to connect the decoding process to a server. Above, an Internet browser is provided as an example. A browser may be implemented in conventional PCs, handheld devices, wireless phones, stereo systems, set top boxes, etc. However, the communication application need not be based on computer network protocols. For wireless devices, where the marked content is played on wireless carrier frequencies, the communication application can employ wireless communication technology to forward identifiers and context information to servers that map this information to actions or metadata and return it via a wireless carrier frequency to user's handset.

Tracking Transactions and Report Generation

As depicted in FIG. 1 and described above, the servers for mapping identifiers to actions may be programmed to dispense a transaction log into a log file. A report generation process can then enable users to define and request queries of data from the log file based on a particular identifier, a particular type of context information (time frame, geographic location, user demographics, etc.), a particular action, etc.

Capture Devices

As noted above, the decoding process may be implemented in a variety of devices or software that process media objects.

These devices and software include programmable devices such as personal computers, personal digital assistants, telephone handsets, set-top boxes, personal stereos, hi-fi components, tuners, receivers, televisions, etc. as well as hardwired devices that may be incorporated into these systems and devices.

In some contexts, it is useful to implement a recording function. This is particularly true in devices that receive a broadcast or stream of media content and need to capture at least a portion of it to decode an identifier. Examples of these devices are radio receivers, and wireless telephone handsets. The record function may be automatic or user activated. In the latter case, the user actuates an input device to control the record process and optionally the record duration. For example, the user may hear a song that she likes and press record. The device, in turn, records at least a part of the object that is currently being received (an audio, visual or audio visual signal). The user can then decide contemporaneously or at a later time to execute the identifier decoding process on the recorded signal. The recording function can be designed to execute for a pre-determined or user specified duration.

In the case of radio and television tuners/receivers, the record function can be used to capture a media signal as it is received. In the case of a telephone handset, the record function can be used for a variety of functions, such as recording part of a telephone conversation, recording speech or other ambient audio through a microphone, or recording a media signal received by the handset via a wireless communication channel. The recordings can be compressed and stored in local memory on the device. In addition, they may be annotated with metadata about the media signal, such as a time stamp to show time of capture, a location stamp to show location of capture, metadata extracted from the object (in band or out of band data), etc. A global positioning device may provide the location stamp. Some wireless phone systems are capable of computing location of a telephone handset via triangulation. This location data may be used to provide geographic location coordinates or the name of nearby landmark, city name, etc.

The metadata may be displayed on a display device to help the user remember the context of a particular recording. In addition, it may be provided as context information along with an identifier to a server that links the identifier and context information to metadata or actions.

Transmarking

In some applications, it may be useful to convert auxiliary information embedded in a media signal from one format to another. This converting process is referred to as transmarking. Transmarking may include converting an out of band identifier like a tag in a header/footer to a watermark or vice versa. It may also involve converting a message in one watermark format to another. The process involves a decoding operating on an input media object, and an encoding of the decoded information into the media object. It may also involve a process for removing the mark originally in the input object to avoid interference with the newly inserted mark.

There are a variety of reasons to perform transmarking. One is to make the embedded information more robust to the types of processing that the media object is likely to encounter, such as converting from one watermark used in packaged media to another watermark used in compressed, and electronically distributed media, or a watermark used in radio or wireless phone broadcast transmission applications.

This type of transmarking process may be performed at various stages of a media object's distribution path. As suggest previously, an identifier in a watermark or file header/footer may be encoded at the time of packaging the content for distribution, either in an electronic distribution format or a physical packaged medium, such as an optical disk or magnetic memory device. At some point, the media signal may be converted from one format to another. This format conversion stage is an opportunity to perform transmarking that is tailored for the new format in terms of robustness and perceptibility concerns. The new format may be a broadcast format such as digital radio broadcast, or AM or FM radio broadcast. In this case, the identifier may be transmarked into a watermark or other metadata format that is robust for broadcast applications. The new format may be a compressed file format (e.g., ripping from an optical disk to an MP3 format). In this case, the identifier may be transmarked into a file header/footer or watermark format that is robust and compatible with the compressed file format.

The transmarking process may leave an existing embedded identifier in tact and layer an additional identifier into the media object. This may include encoding a new watermark that does not interfere with an existing watermark (e.g., insert the new watermark in unmarked portions of the media object or in a non-interfering transform domain). It may also include adding additional or new identifier tags to headers or footers in the file format.

Amplifying an Embedded Identifier

Rather than converting embedded data to another format, an amplifying process may be used to renew an identifier that has become weakened or separated due to processing of the media object in which it is embedded. In this case, a decoder and encoder pair may be used to determine the current identifier and re-encode it. Of course, the encoder can also choose to embed a new or additional identifiers as well.

If the previous identifier is lost, the encoder can query an identifier database established in the registration process, passing identifying information about the media object. The database uses the identifying information to find an associated identifier and returns it to the encoder for embedding in the media object.

Managing On-Line Media Library Through Links In Media Signals

The forms in which digital media content can be distributed continue to evolve rapidly. Video and audio signals can be stored in a digital content package and distributed in physical form, such as an optical or magnetic storage medium, or in an electronic form (e.g., transferred over a network in a compressed or uncompressed form). In this document, a content package refers to a format in which a title, e.g., a film, song, musical album, multimedia collection etc., is played from a complete representation of that title.

In contrast, media content may also be delivered over a wire or wireless communication link in a streaming format. Obviating the need to have a complete copy of the title, a streaming format enables the receiver to play the title as it receives portions of it in a data "stream" from an external source. The following sections describe applications for linking media signals to other content and data using metadata and/or steganography.

Linking Packaged Digital Media to On-Line Library of Media Titles

In this application, a local application (e.g., a device or software process) extracts an identifier from a media signal stored in a content package, and communicates the identifier to a database application to create and manage a library of media titles. Examples of a content package include optical media such as CDs and DVDs, magnetic media such as floppy disks and tapes, flash memory, compressed media files, etc. The user places the package into a media reader, such as a disk drive, player, etc. Operating in conjunction with the media reader, the local application extracts information (e.g., a portion of the media signal) from the package, extracts the identifier, and sends it to a database system (e.g., a server on the Internet). In response, the database system determines the corresponding title and adds the title to an on-line library (e.g., external storage accessible via the Internet). The library may be set up as a personal collection, or a collection for a group of users.

To identify the user(s)' library, the local application provides a user identifier. This user identifier may be authentication information entered by a user (such as a user name and password), or alternatively, may be an identifier (such a device ID) sent automatically by the local application.

The title (i.e. content) is added to the on-line library, by transferring a copy of the selection (e.g., music track, video, etc.) from a master database (e.g., a library of MP3 files, or some other streaming or downloadable content format) to the user's on-line library collection. This arrangement avoids the need to upload content from the user's application. Also, it is a much more secure approach than techniques that simply read title data from a CD and relay same to the on-line library. (It is a simple task for an unscrupulous user to fake the presence of a CD by determining how the client CD software specifies the title to the on-line library, and then mimic same even without possession of a bona fide CD.) The in-band encoding presented by watermarks offers innately better security, and provides opportunities for enhanced security by encryption, etc.

In other arrangements, a copy of the selection, per se, is not transferred from the master database to the user's library, but rather a reference (e.g., a link or pointer) to the master library is added to the user's library. Efficiencies in storage can thereby be achieved (i.e., a copy of each selection is stored only once, from which an unlimited number of users' on-line libraries can link to it).

The identifier may be placed in the content package by steganographically encoding it in the media signal. For example, the identifier may be a reference number (e.g., of 24-256 bits) or the text name of the title embedded in a digital watermark. In a digital watermark implementation, a watermark embedder encodes the identifier in video, audio and/or images. The local application includes a watermark detector that reads at least a portion of the media signal from the package, detects the watermark, and reads the identifier embedded in the watermark. The detector may be implemented in a computer program (e.g., driver application, browser plug-in, etc.). A communication application, such as an Internet browser, then communicates the identifier to the database system, which may be implemented using conventional database management and Internet server software.

One advantage of this application is that it allows a user to create an on-line library of titles, and then playback those titles from the library on demand. For example, the user may organize a large collection of titles, view titles in a variety of formats, and playback individual songs or videos, in any order and at any time. The user can request playback anywhere by connecting to the on-line database and requesting a streaming delivery or file down load.

For playback, a player application (e.g., device or application program on a computer) sends a request to a content delivery system via a wire or wireless connection. The content delivery system first checks to make sure that the user has the title in her on-line library. In addition, it may authenticate the user and determine usage rights before returning any content. If it determines playback to be authorized, the content delivery system sends the titles by streaming the content to the player application, on demand, in the order requested.

Linking Streaming Media to On-Line Library of Media Titles

A similar scheme to the one described in the previous section may be implemented for streaming media. In this case, the local application need not have a packaged version of the content to add a title to a user's library. Instead, the local application extracts an identifier from a portion of the streaming content. The identifier may be embedded in a watermark that is replicated throughout the media signal. In the event that the portion of the streaming media does not contain an identifier, the local application continues to execute a detection process on the media signal as it arrives until it has extracted the identifier.

In either of the above applications, the user can initiate a process of extracting the watermark by an explicit request, such as by clicking on the visual UI of the local application, entering a voice command, etc. Alternatively, the local application may initiate the detection process automatically whenever the user starts playback from packaged or streaming content.

The identifier may also include usage rights that dictate how the user (as identified by a user ID) may retrieve a copy from the library for playback. For example, the watermark may include a number that represents the number of times the user can access the content for playback.

Linking Packaged or Streaming Media to Database of Auxiliary Information Related to the Media In addition to linking to a title database, the identifier may also link to other information or machine instructions relating to the media. For example, the database may send a set of options back to the user (e.g., in the form of a HTML page) that allow the user to select and download additional information related to the media signal in which the identifier is embedded.

Operating Environment for Computer Implementations

Figure 3:
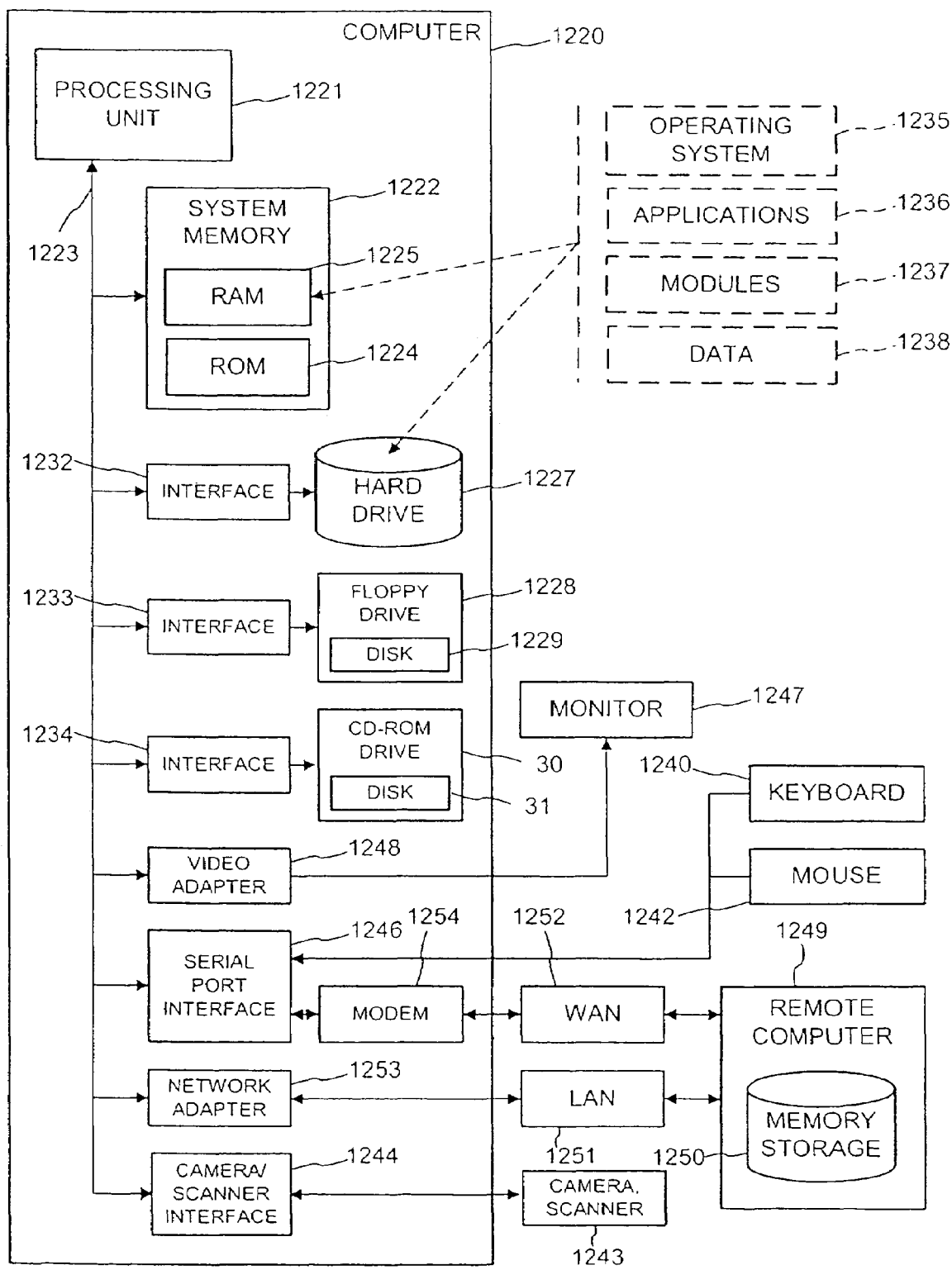
FIG. 3 is a diagram illustrating an operating environment for multimedia content management and delivery applications.

FIG. 3 illustrates an example of a computer system that serves as an operating environment for software implementations of the systems described above. The software applications may be implemented in C/C++ and are portable to many different computer systems. FIG. 3 generally depicts one such system.

The computer system shown in FIG. 3 includes a computer 1220, including a processing unit 1221, a system memory 1222, and a system bus 1223 that interconnects various system components including the system memory to the processing unit 1221.

The system bus may comprise any of several types of bus structures including a memory bus or memory controller, a peripheral bus, and a local bus using a bus architecture such as PCI, ISA and EISA, to name a few.

The system memory includes read only memory (ROM) 1224 and random access memory (RAM) 1225. A basic input/output system 1226 (BIOS), containing the basic routines that help to transfer information between elements within the computer 1220, such as during start-up, is stored in ROM 1224.

The computer 1220 further includes a hard disk drive 1227, a magnetic disk drive 1228, e.g., to read from or write to a removable disk 1229, and an optical disk drive 1230, e.g., for reading a CD-ROM or DVD disk 1231 or to read from or write to other optical media. The hard disk drive 1227, magnetic disk drive 1228, and optical disk drive 1230 are connected to the system bus 1223 by a hard disk drive interface 1232, a magnetic disk drive interface 1233, and an optical drive interface 1234, respectively. The drives and their associated computer-readable media provide nonvolatile storage of data, data structures, computer-executable instructions (program code such as dynamic link libraries, and executable files), etc. for the computer 1220.

Although the description of computer-readable media above refers to a hard disk, a removable magnetic disk and an optical disk, it can also include other types of media that are readable by a computer, such as magnetic cassettes, flash memory cards, digital video disks, and the like.

A number of program modules may be stored in the drives and RAM 1225, including an operating system 1235, one or more application programs 1236, other program modules 1237, and program data 1238.

A user may enter commands and information into the personal computer 1220 through a keyboard 1240 and pointing device, such as a mouse 1242. Other input devices may include a microphone, joystick, game pad, satellite dish, digital camera, scanner, or the like. The microphone may be used to capture audio signals. Similarly, a digital camera or scanner 43 may be used to capture video and images. The camera and scanner are each connected to the computer via a standard interface 44. Currently, there are digital cameras designed to interface with a Universal Serial Bus (USB), Peripheral Component Interconnect (PCI), and parallel port interface. Two emerging standard peripheral interfaces for cameras include USB2 and 1394 (also known as firewire and iLink).

These and other input devices are often connected to the processing unit 1221 through a serial port interface 1246 that is coupled to the system bus, but may be connected by other interfaces, such as a parallel port, game port or a universal serial bus USB).

A monitor 1247 or other type of display device is also connected to the system bus 1223 via an interface, such as a video adapter 1248. In addition to the monitor, personal computers typically include other peripheral output devices (not shown), such as speakers and printers.

The computer 1220 operates in a networked environment using logical connections to one or more remote computers, such as a remote computer 1249. The remote computer 1249 may be a server, a router, a peer device or other common network node, and typically includes many or all of the elements described relative to the computer 1220, although only a memory storage device 1250 has been illustrated in FIG. 3. The logical connections depicted in FIG. 3 include a local area network (LAN) 1251 and a wide area network (WAN) 1252. Such networking environments are commonplace in offices, enterprise-wide computer networks, intranets and the Internet.

When used in a LAN networking environment, the computer 1220 is connected to the local network 1251 through a network interface or adapter 1253. When used in a WAN networking environment, the personal computer 1220 typically includes a modem 1254 or other means for establishing communications over the wide area network 1252, such as the Internet. The modem 1254, which may be internal or external, is connected to the system bus 1223 via the serial port interface 1246.

In a networked environment, program modules depicted relative to the personal computer 1220, or portions of them, may be stored in the remote memory storage device. The processes detailed above can be implemented in a distributed fashion, and as parallel processes. It will be appreciated that the network connections shown are exemplary and that other means of establishing a communications link between the computers may be used.

The computer may establish a wireless connection with external devices through a variety of peripherals such as a cellular modem, radio transceiver, infrared transceiver, etc.

While a computer system is offered as example operating environment, the applications may be implemented in a variety of devices and systems, including servers, workstations, hand-held devices (e.g., hand held audio or video players, Personal Digital Assistants such as Palm Pilot, etc.), network appliances, distributed network systems, etc.

Concluding Remarks

Having described and illustrated the principles of the technology with reference to specific implementations, it will be recognized that the technology can be implemented in many other, different, forms. To provide a comprehensive disclosure without unduly lengthening the specification, applicants incorporate by reference the patents and patent applications referenced above. These patents and patent applications provide additional implementation details. They describe ways to implement processes and components of the systems described above. Processes and components described in these applications may be used in various combinations, and in some cases, interchangeably with processes and components described above.

The particular combinations of elements and features in the above-detailed embodiments are exemplary only; the interchanging and substitution of these teachings with other teachings in this and the incorporated-by-reference patents/applications are also contemplated.

What is claimed is:

1. A method comprising:
   obtaining identifying data derived with fingerprinting from data representing audio elements of an audio signal or derived with fingerprinting from data representing video picture elements of a video signal, the audio signal or video signal corresponding to a media signal captured by a wireless handheld device;
   determining a media title that corresponds to the identifying data;
   determining usage rights associated with at least one of the media title or a user of the wireless handheld device;
   identifying the user of the wireless handheld device or a library of the media titles that is associated with the user of the wireless handheld device; and
   adding the media title to the library of media titles that is associated with the user if so permitted by the usage rights.

2. The method of claim 1 wherein the library comprises a network-accessible library that is remotely located from the wireless handheld device.

3. The method of claim 1 wherein usage rights associated with the user are associated through the wireless handheld device.

4. The method of claim 1 further comprising providing the media title to the wireless handheld device if so permitted by the usage rights.

5. The method of claim 1 wherein the identifying data comprises a multi-component identifier.

6. The method of claim 1 wherein the identifying data links to the usage rights.

7. A computer readable medium comprising instructions stored thereon to cause a multi-purpose electronic processor to perform the method of claim 1.

8. The method of claim 1 wherein said method is executed by a network server that is remotely located with respect to the wireless handheld device.

9. A computer server comprising:
electronic memory;
one or more computer processors; and
instructions stored in said memory for execution by said one or more computer processors, said instructions comprising instructions to cause the one or more computer processors to:
i) obtain identifying data derived with fingerprinting from data representing audio elements of an audio signal or derived with fingerprinting from data representing video picture elements of a video signal, the audio signal or video signal corresponding to a media signal captured by a wireless handheld device; ii) determine a media title that corresponds to the identifying data; iii) determine usage rights associated with at least one of the media title or a user of the wireless handheld device; iv) identify the user of the wireless handheld device or a library of the media titles that is associated with the user of the wireless handheld device; and v) add the media title to the library of media titles that is associated with the user if so permitted by the usage rights.

10. The computer server of claim 9 wherein the user device comprises a wireless handheld device.

11. The computer server of claim 10 wherein the library comprises a network-accessible library that is remotely located from the wireless handheld device.

12. The computer server of claim 9 wherein usage rights associated with the user are associated through the user device.

13. The computer server of claim 9 further comprising providing the media title to the user device if so permitted by the usage rights.

14. The computer server of claim 9 wherein the identifying data comprises a multi-component identifier.

15. A wireless handheld device comprising:
a transceiver;
a microphone;
at least one multi-purpose electronic processor configured as a processing unit;
a system bus; and
memory in communication with the processing unit via the system bus, wherein the memory comprises instructions stored therein for execution by the processing unit, the instructions comprising instructions to cause the processing unit to:
(i): control capture via the microphone of data representing audio elements of an audio signal or control capture via the microphone of data representing video picture elements of a video signal;
(ii): provide information associated with the data representing audio elements of an audio signal or the data representing video picture elements of a video signal for communication through the transceiver, wherein the information is to be provided to a network server, the network server identifying a media title associated with the information and usage rights associated with at least one of the media title or a user of the wireless handheld device, and the network server adding the media title to the library of media titles that is associated with the user if so permitted by the usage rights; and
(iii): process a message received through the transceiver from the network server.

16. The device of claim 15, wherein the message is routed through a network prior to receipt at the device.

17. The device of claim 16, wherein the network comprises a cellular network.

18. The device of claim 15, wherein the information is routed through a network prior to receipt by the network server.

19. The device of claim 18, wherein the network comprises a cellular network.

20. A computer readable storage medium comprising the instructions of claim 15 stored thereon.

21. The device of claim 15 wherein the message comprises at least one of audio or video.

22. The device of claim 15 wherein the media title comprises at least one of audio or video content.

23. The device of claim 15 wherein the instructions to provide information associated with the data representing audio elements of an audio signal or the data representing video picture elements of a video signal comprise instructions to derive the information identifier from the data representing audio elements of an audio signal or the data representing video picture elements of a video signal.

24. A programmed computing device storing instructions in memory, said instructions are executable by said programmed computing device to perform the acts of claim 1.

25. A programmed computing device storing instructions in memory, said instructions are executable by said programmed computing device to perform the acts of claim 3.

26. A computer readable media comprising instructions stored thereon to cause a multi-purpose electronic processor to perform the acts of claim 3.

27. A programmed computing device storing instructions in memory, said instructions are executable by said programmed computing device to perform the acts of claim 5.

28. A computer readable media comprising instructions stored thereon to cause a multi-purpose electronic processor to perform the acts of claim 5.

29. The computer server of claim 9, in which the one or more computer processors are operating to perform at least one of the functions recited therein.

30. The wireless handheld device of claim 15 in which the processing unit is operating to perform at least one of the functions recited therein.

* * * * *

UNITED STATES PATENT AND TRADEMARK OFFICE
CERTIFICATE OF CORRECTION

PATENT NO.      : 7,593,576 B2
APPLICATION NO. : 11/004711
DATED           : September 22, 2009
INVENTOR(S)     : Meyer et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1129 days.

Signed and Sealed this

Twenty-first Day of September, 2010

David J. Kappos
*Director of the United States Patent and Trademark Office*